(12) United States Patent
Ryu et al.

(10) Patent No.: US 9,412,013 B2
(45) Date of Patent: Aug. 9, 2016

(54) METHOD AND APPARATUS FOR RECOGNIZING HAND MOTION

(71) Applicant: ELECTRONICS AND TELECOMMUNICATIONS RESEARCH INSTITUTE, Daejeon (KR)

(72) Inventors: Moon Wook Ryu, Seoul (KR); Soonchan Park, Daejeon (KR); Ju Yong Chang, Daejeon (KR); Ji Young Park, Daejeon (KR); Kwang Hyun Shim, Daejeon (KR); Hee Kwon Kim, Daejeon (KR); Hyuk Jeong, Daejeon (KR); Seung Woo Nam, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/591,307

(22) Filed: Jan. 7, 2015

(65) Prior Publication Data

US 2015/0248582 A1    Sep. 3, 2015

(30) Foreign Application Priority Data

Mar. 3, 2014    (KR) .......................... 10-2014-0025072

(51) Int. Cl.
*G06K 9/00*    (2006.01)
*H04N 5/33*    (2006.01)
(Continued)

(52) U.S. Cl.
CPC .......... *G06K 9/00355* (2013.01); *G06T 7/0081* (2013.01); *G06T 7/2073* (2013.01); *H04N 5/33* (2013.01); *G06T 2207/10028* (2013.01); *G06T 2207/10048* (2013.01)

(58) Field of Classification Search
USPC ........ 382/100, 103, 106–107, 154, 162, 168, 382/173, 181, 190, 199, 203, 209, 232, 382/254–259, 266, 274, 276, 285–291, 305, 382/312, 321; 345/156, 158; 348/77
See application file for complete search history.

(56) References Cited

U.S. PATENT DOCUMENTS

2009/0103780 A1*  4/2009  Nishihara ............... G06F 3/017
                                                     382/103
2009/0153655 A1*  6/2009  Ike .......................... G06F 3/012
                                                     348/77

(Continued)

FOREIGN PATENT DOCUMENTS

JP    2009-080539 A    4/2009
KR    10-0457929 B1    11/2004

(Continued)

OTHER PUBLICATIONS

Seyed Eghbal Ghobadi, et al. "Real Time Hand Based Robot Control Using Multimodal Images", IAENG International Journal of Computer Science, 35(4), pp. 500-505, Nov. 20, 2008.

(Continued)

*Primary Examiner* — Seyed Azarian
(74) *Attorney, Agent, or Firm* — LRK Patent Law Firm

(57) ABSTRACT

A hand motion recognizing apparatus obtains an image with first resolution including a hand and an image with second resolution higher than the first resolution including the hand, maps the image with the first resolution and the image with the second resolution, extracts a hand position from the image with the first resolution, obtains a hand region corresponding to the hand position from the image with the second resolution mapped to the image with the first resolution, and subsequently estimates a hand motion from the hand region.

7 Claims, 4 Drawing Sheets

(51) Int. Cl.
*G06T 7/00* (2006.01)
*G06T 7/20* (2006.01)
*G06F 3/033* (2013.01)

(56) References Cited

U.S. PATENT DOCUMENTS

| | | | | |
|---|---|---|---|---|
| 2012/0119985 A1* | 5/2012 | Kang | ............ | G06F 3/017 345/156 |
| 2012/0162385 A1 | 6/2012 | Park et al. | | |
| 2012/0235903 A1* | 9/2012 | Im | ............ | G06F 3/005 345/158 |
| 2013/0108107 A1* | 5/2013 | Kang | ............ | G06K 9/209 382/103 |

FOREIGN PATENT DOCUMENTS

| | | |
|---|---|---|
| KR | 10-0826878 B1 | 5/2008 |
| KR | 10-2011-0080612 A | 7/2011 |
| KR | 10-2012-0051212 A | 5/2012 |

OTHER PUBLICATIONS

Moonwook Ryu et al., "Improvement of Hand Gesture Recognition using Depth and Infrared Camera", Summer symposium in The Institute of Electronics and Information Engineers, vol. 37, No. 1, Jun. 26, 2014.

* cited by examiner

METHOD AND APPARATUS FOR RECOGNIZING HAND MOTION

CROSS-REFERENCE TO RELATED APPLICATION

This application claims priority to and the benefit of Korean Patent Application No. 10-2014-0025072 filed in the Korean Intellectual Property Office on Mar. 3, 2014, the entire contents of which are incorporated herein by reference.

BACKGROUND OF THE INVENTION

1. Field of the Invention

The present invention relates to a method and apparatus for recognizing a hand motion.

2. Description of the Related Art 3D motion recognizing systems have been used in various application fields such as human-computer interaction (HCI), motion capture for computer graphics, gesture/action recognition for image monitoring, healthcare, and the like. In particular, 3D motion recognizing systems have drawn much attention as a core technique enabling natural user interface for smart devices or interactive digital content.

In such a 3D motion recognizing system, a method and apparatus for recognizing a hand motion are expected to infinitely increase the value of user interface such as promoting diversity of user interfaces and maximizing user convenience.

However, current 3D motion recognizing systems may be able to extract skeletal joints from a depth map image to recognize a user motion, and generally, resolution of a depth map may allow for extraction of a position of large skeletal joints (elbow, knee, wrist, and the like) but it is not sufficient to recognize a shape of a finger.

A related art providing a solution to this problem includes a technique of analyzing a skeletal joint using a depth camera and identifying a finger based on a skin color from an RGB image. However, the use of an RGB image may lessen accuracy of an algorithm due to different skin colors of different races, and an RGB image cannot be checked in a state in which lighting is dim, making it impossible to identify a hand gesture.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for recognizing a hand motion having advantages of increasing accuracy of recognition of a finger motion regardless of an external environment or skin color.

An exemplary embodiment of the present invention provides a method for recognizing a hand motion by a hand motion recognizing apparatus. The hand motion recognizing method includes: obtaining an image with first resolution including a hand; obtaining an image with second resolution including the hand; mapping the image with the first resolution and the image with the second resolution; obtaining a hand position from the image with the first resolution; extracting a hand region corresponding to the hand position from the image with the second resolution mapped to the image with the first resolution; and estimating a hand motion from the hand region.

The first resolution may be lower than the second resolution.

The image with the first resolution may be a depth image and the image with the second resolution may be an infrared (IR) image.

The image with the first resolution and the image with the second resolution may be obtained from a single image sensor.

The obtaining of the image with the first resolution may include creating the image with the first resolution by using IR light, and the obtaining of the image with the second resolution may include creating the image with the second resolution by using IR light.

The obtaining of the image with the first resolution may include creating the image with the first resolution by using structured IR light, and the obtaining of the image with the second resolution may include creating the image with the second resolution using IR light.

The image with the first resolution and the image with the second resolution may be alternately created.

The image with the first resolution and the image with the second resolution may be obtained from image sensors, respectively.

Another embodiment of the present invention provides a hand motion recognizing apparatus. The hand motion recognizing apparatus may include an image obtaining unit and an estimating unit. The image obtaining unit may obtain an image with first resolution including a hand and an image with second resolution higher than the first resolution, the image with the second resolution including the hand.

The estimating unit may map the image with the first resolution and the image with the second resolution, obtain a hand position from the image with the first resolution, extract a hand region corresponding to the hand position from the image with the second resolution mapped to the image with the first resolution, and subsequently estimate a hand motion from the hand region.

The image with the first resolution may be a depth image and the image with the second resolution may be an infrared (IR) image.

The image obtaining unit may create the image with the first resolution by using IR structured light, create the image with the second resolution by using IR light, and alternately create the image with the first resolution and the image with the second resolution.

The image obtaining unit may create the image with the first resolution and the image with the second resolution by using IR light.

The image obtaining unit may include a first image sensor configured to obtain the image with the first resolution by using IR structured light, and a second image sensor configured to obtain the image with the second resolution by using IR light.

DETAILED DESCRIPTION OF THE EMBODIMENTS

Figure 1:
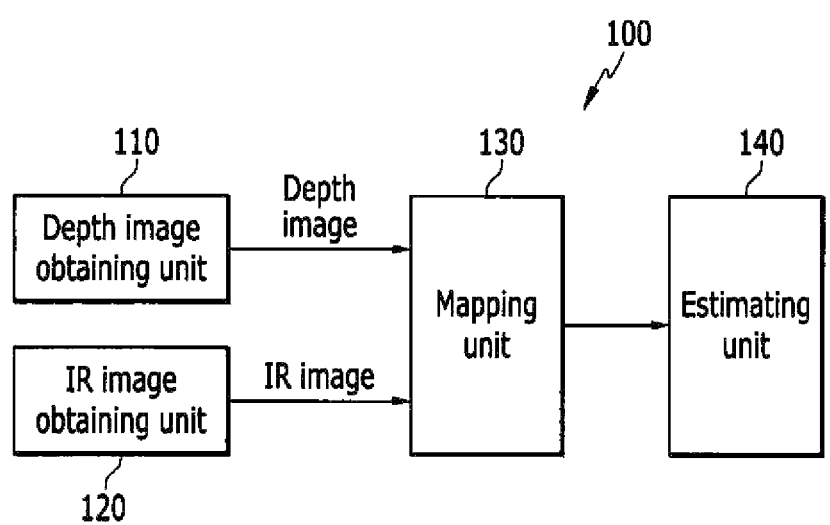
FIG. 1 is a view illustrating a hand motion recognizing apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Hereinafter, a hand motion recognizing method and apparatus according to exemplary embodiments of the present invention will be described in detail with reference to the accompanying drawings.

Figure 2:
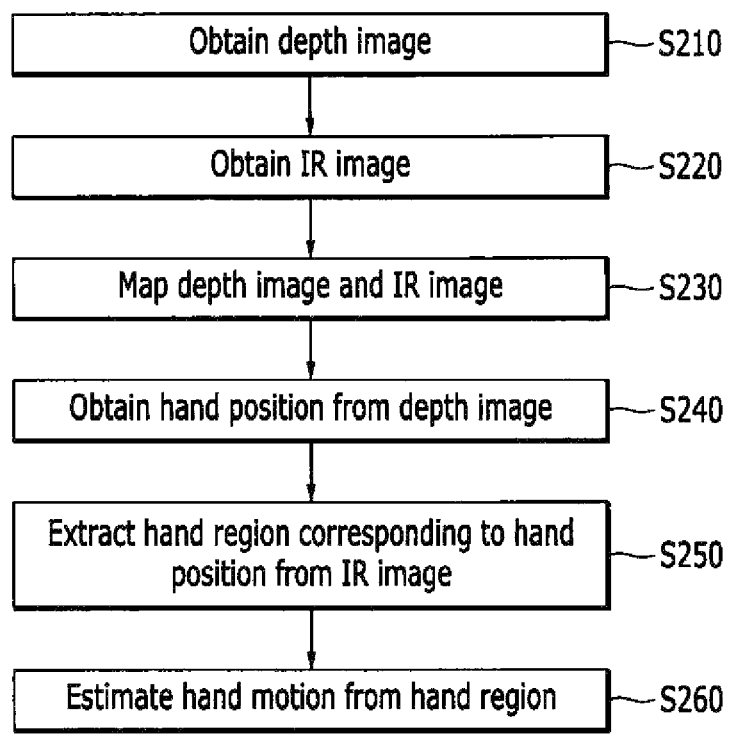
FIG. 2 is a flowchart illustrating a hand motion recognizing method according to an exemplary embodiment of the present invention.

FIG. 1 is a view illustrating a hand motion recognizing apparatus according to an exemplary embodiment of the present invention, and FIG. 2 is a flowchart illustrating a hand motion recognizing method according to an exemplary embodiment of the present invention.

Referring to FIG. 1, a hand motion recognizing apparatus 100 includes a depth image obtaining unit 110, an infrared (IR) image obtaining unit 120, a mapping unit 130, and an estimating unit 140.

Referring to FIG. 2, the depth image obtaining unit 110 obtains a depth image of the entirety or a portion of a user's body including a hand (S210). The depth image obtaining unit 110 may be an image sensor which may be able to capture a depth image of the entirety or a portion of the user's body. For example, the depth image obtaining unit 110 may be a CMOS image sensor that is highly reactive to infrared rays (IR).

The IR image obtaining unit 120 obtains an IR image of the entirety of a portion of the user's body including a hand (S220). The IR image obtaining unit 120 may be, for example, a CMOS image sensor. The IR image obtaining unit 120 uses infrared light that is not visible to the human eye, and thus lighting is not required. Therefore, even in an environment in which brightness of lighting is changed or in a dark environment, a hand may be effectively recognized by using an IR image.

Here, a depth image has low resolution, relative to the IR, image. The IR image, which is a black and white image, has resolution having a sufficiently high degree to estimate a hand motion and posture. For example, resolution of the depth image may be 640×480, for example, while resolution of the IR image may be 1280×960, higher than that of the depth image.

In order to obtain a depth image with low resolution, the depth image obtaining unit 110 uses IR structured light or IR light. In case of using structured light, the depth image obtaining unit 110 may project IR structured light and obtain a depth image with low resolution using information of a structure that is deformed according to objects. In case of using IR light, the depth image obtaining unit 110 may measure a time duration in which light is returned, to obtain a depth image with low resolution.

The IR image obtaining unit 120 uses IR light to obtain an IR image. IR light has an infrared wavelength (720 nm or higher), and the IR image obtaining unit 120 projects IR light to an object and senses infrared rays reflected from the object to obtain an IR image with high resolution.

Here, by differentiating an infrared wavelength of IR structured light, and an infrared wavelength of IR light, the depth image and the IR image may be obtained using two image sensors.

The mapping unit 130 maps the depth image and the IR image (S230). Mapping the depth image and the IR image refers to matching a brightness value of the IR image to the depth image having only a distance value.

The estimating unit 140 obtains a position of a hand from the depth image (S240). In order to obtain a position of the hand from the depth image, various methods may be used and the present invention may not be limited to a particular method. For example, the estimating unit 140 may extract a position of the hand from the depth image through a method of extracting a human being's skeletal joints.

The estimating unit 140 extracts a hand region from the IR image based on the position of the hand obtained from the depth image (S250). The estimating unit 140 may extract a region corresponding to the position of the hand from the hand region. The estimating unit 140 may extract a region obtained by enlarging the region corresponding to the position of the hand, as a hand region. For example, the estimating unit 140 may extract a region which continues from the region corresponding to the position of the hand and includes the region corresponding to the position of the hand, as a hand region.

The estimating unit 140 estimates a hand motion from the hand region extracted from the IR image (S260). The hand motion may be a concept including a posture of fingers. As for estimation of a hand motion, each motion and posture is estimated through a method of classifying input images based on previously learned motion and posture data.

In this manner, the hand motion recognizing apparatus 100 extracts a position of a hand from an image including the hand with low resolution, and obtains a hand region corresponding to the position of the hand from an IR image with high resolution mapped to an image with low resolution.

In general, whether a hand exists, recognizing a position of a hand, and an analysis of a hand shape are all performed over a large number of pixels at high resolution, and high performance hardware is required and a period of time for estimating a hand motion is also increased.

In contrast, according to an exemplary embodiment of the present invention, first, a position value of a hand is roughly extracted using a small number of pixels at low resolution, and calculation for estimating a hand motion is performed only on pixels corresponding to a hand region in an IR image with high resolution based on the extracted position value of the hand. Thus, calculation and a time for estimating a hand motion can be significantly reduced.

Figure 3:
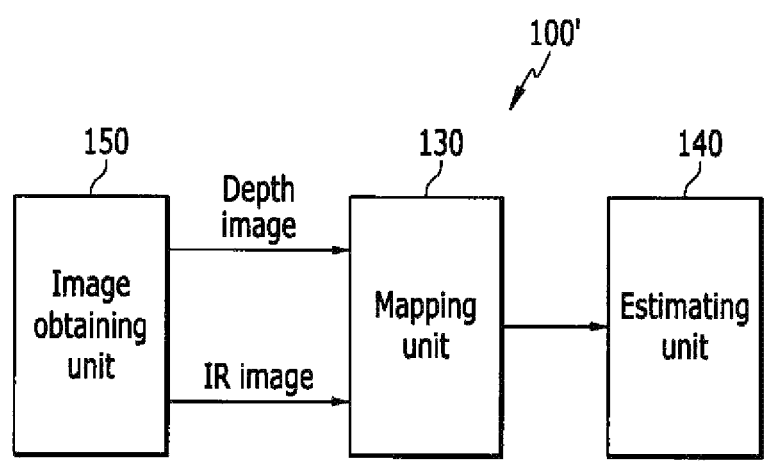
FIG. 3 is a view illustrating a hand motion recognizing apparatus according to another exemplary embodiment of the present invention.

FIG. 3 is a view illustrating a hand motion recognizing apparatus according to another exemplary embodiment of the present invention.

Referring to FIG. 3, a hand motion recognizing apparatus 100' includes an image obtaining unit 150, a mapping unit 130, and an estimating unit 140.

The image obtaining unit 150 obtains both a depth image and an IR image. For example, the image obtaining unit 150 may be a CMOS image sensor.

As mentioned above, the image obtaining unit 150 uses IR structured light or IR light to obtain a depth image with low resolution.

In case of using structured light, the image obtaining unit 150 may project IR structured light and obtain a depth image with low resolution using information of a structure that is deformed according to objects.

In case of using IR light, the image obtaining unit 150 may project IR light to an object and measure a time duration in which light is returned after being reflected from the object, to thus, obtain a depth image with low resolution. Also, the image obtaining unit 150 may obtain an IR image with high resolution using IR reflected from the object as is.

That is in case of using IR light, the image obtaining unit 150 may obtain both a depth image and an IR image using only a single IR light source.

Meanwhile, in case of using IR structured light, IR structured light and IR light need to be used to obtain a depth image and an IR image. Thus, the image obtaining unit 150 alternately obtains a depth image and an IR image such that no interference occurs between the IR structure light and IR light. For example, when the image obtaining unit 150 operates at a period of 60 Hz, the image obtaining unit 150 activates IR structured light and deactivates IR light at a first period to obtain a depth image with low resolution and activates IR light and deactivates IR structured light at a second period to obtain an IR image with high resolution. In this manner, the image obtaining unit 150 may alternately obtain the depth image and the IR image without collision.

Thus, since the depth image can be obtained even with the CMOS image sensor, both the depth image and the IR image can be obtained using only the single CMOS image sensor.

At least some of the functions of the hand motion recognizing method and apparatus according to the exemplary embodiment of the present invention as described above may be implemented by hardware or may be implemented by software combined with hardware. Hereinafter, an exemplary embodiment in which the hand motion recognizing method and apparatus are combined with a computer system will be described in detail with reference to FIG. 4.

Figure 4:
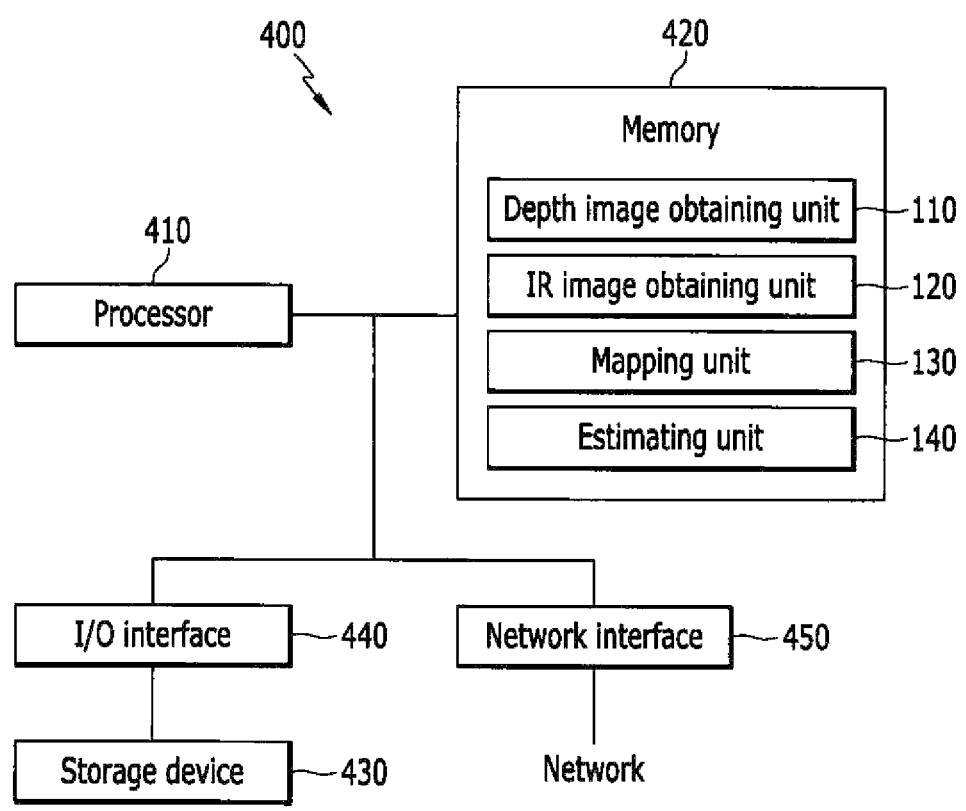
FIG. 4 is a schematic view illustrating a hand motion recognizing apparatus according to another exemplary embodiment of the present invention.

FIG. 4 is a schematic view illustrating a hand motion recognizing apparatus according to another exemplary embodiment, of the present invention, which shows a system that may be used to perform at least some of the functions of the depth image obtaining unit 110, the IR image obtaining unit 120, and the estimating unit 140. Also, FIG. 4 shows a system that may be used to perform at least some of the functions of the image obtaining unit 150 and the estimating unit 140 described above with reference to FIG. 3.

Referring to FIG. 4, the hand motion recognizing apparatus 400 includes a processor 410, a memory 420, at least one storage device 430, an input/output (I/O) interface 440, and a network interface 450.

The processor 410 may be implemented as a central processing unit (CPU), any other chip sets, a microprocessor, or the like, and the memory 420 may be implemented as a medium such as a RAM including a dynamic random access memory (DRAM), a rambus DRAM (RDRAM), a synchronous DRAM (SDRAM), a static RAM (SRAM), or the like, The storage device 530 may be implemented as a permanent or volatile storage device, such as a hard disk, a compact disk read only memory (CD-ROM), a CD rewritable (CD-RW), a digital video disk ROM (DVD-ROM), a DVD-RAM, a DVD-RW disk, a blue-ray disk, or the like, flash memories, or various types of RAMs. The I/O interface 440 enables the processor 410 and/or the memory 420 to access the storage device 430, and the network interface 450 enables the processor 410 and/or the memory 420 to access a network.

In this case, the processor 410 may load a program command for implementing at least some of functions of the depth image obtaining unit 110, the IR image obtaining unit 120, the mapping unit 130, and the estimating unit 140 to the memory 420 to provide control to perform the operations described above with reference to FIGS. 1 and 2. The program command may be stored in the storage device 430 or may be stored in a different system connected via a network.

The processor 410, the memory 420, the storage device 430, the I/O interface 440, and the network interface 450 illustrated in FIG. 4 may be implemented in a single computer or may be implemented in a plurality of computers in a distributed fashion.

The hand motion recognizing apparatus 400 in FIG. 4 is illustrated as a system formed by coupling the hand motion recognizing apparatus described above with reference to FIGS. 1 and 2 to a computer system, or it may be a computer system that may be used to perform at least some of the functions of the image obtaining unit 150, the mapping unit 130, and the estimating unit 140 described above with reference to FIG. 3. In this case, the processor 410 may load a program command for implementing at least some of the functions of the depth image obtaining unit 150, the mapping unit 130, and the estimating unit 140 to the memory 420 and provide control to perform the operations described above with reference to FIG. 3.

According to exemplary embodiments of the present invention, since a shape of a finger is identified regardless of an external environment and skin color, various interactions may be allowed.

The embodiments of the present invention may not necessarily be implemented only through the foregoing devices and methods, but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computer-implemented method for recognizing a hand motion by a hand motion recognizing apparatus, the method comprising:
obtaining an image with first resolution including a hand;
obtaining an image with second resolution including the hand;
mapping, by a processor, the image with the first resolution and the image with the second resolution;
obtaining a hand position from the image with the first resolution;
extracting, by the processor, a hand region corresponding to the hand position from the image with the second resolution mapped to the image with the first resolution; and
estimating, by the processor, a hand motion from the hand region,
wherein the image with the first resolution and the image with the second resolution are obtained from a single image sensor,
wherein the image with the first resolution is a depth image and the image with the second resolution is an infrared (IR) image, wherein the obtaining of the image with the first resolution comprises creating the image with the first resolution by projecting IR light to an object and measuring a time duration in which the IR light is returned after being reflected from the object, and wherein the obtaining of the image with the second resolution comprises creating the image with the second resolution by using the IR light itself which is reflected from the object as it is.

2. The method of claim 1, wherein the first resolution is lower than the second resolution.

3. The method of claim 1, wherein the obtaining of the image with the first resolution comprises creating the image with the first resolution by using structured IR light, and the obtaining of the image with the second resolution comprises creating the image with the second resolution by using IR light.

4. The method of claim 3, wherein the image with the first resolution and the image with the second resolution are alternately created.

5. A hand motion recognizing apparatus comprising:

at least one hardware processor and a storage;

an image obtaining unit loaded on the at least one hardware processor and configured to obtain an image with first resolution including a hand and an image with second resolution higher than the first resolution, the image with the second resolution including the hand, the image obtaining unit comprises a single image sensor; and an estimating unit loaded on the at least one hardware processor and configured to map the image with the first resolution and the image with the second resolution, obtain a hand position from the image with the first resolution, extract a hand region corresponding to the hand position from the image with the second resolution mapped to the image with the first resolution, and subsequently estimate a hand motion from the hand region, wherein the image with the first resolution is a depth image and the image with the second resolution is an infrared (IR) image, and wherein the image obtaining unit creates the image with the first resolution by projecting IR light to an object and measuring a time duration in which the IR light is returned after being reflected from the object, and creates the image with the second resolution by using the IR light itself which is reflected from the object as it is.

6. The hand motion recognizing apparatus of claim 5, wherein the image obtaining unit creates the image with the first resolution by using IR structured light, creates the image with the second resolution by using IR light, and alternately creates the image with the first resolution and the image with the second resolution.

7. The hand motion recognizing apparatus of claim 5, wherein the image obtaining unit comprises:

a first image sensor configured to obtain the image with the first resolution by using IR structured light; and a second image sensor configured to obtain the image with the second resolution by using IR light.

* * * * *